United States Patent
Arai et al.

(10) Patent No.: US 12,409,719 B2
(45) Date of Patent: Sep. 9, 2025

(54) BATTERY TRAY MADE OF INTEGRALLY MOLDED FIBER REINFORCED PLASTICS

(71) Applicants: Teijin Limited, Osaka (JP); Teijin Automotive Technologies, Inc., Auburn Hills, MI (US)

(72) Inventors: Tsukasa Arai, Osaka (JP); Masatomo Teshima, Osaka (JP); Shunsuke Tamura, Osaka (JP); Hugh Foran, Auburn Hills, MI (US)

(73) Assignees: Teijin Limited, Osaka (JP); Teijin Automotive Technologies, Inc., Auburn Hills, MI (US)

( * ) Notice: Subject to any disclaimer, the term of this patent is extended or adjusted under 35 U.S.C. 154(b) by 304 days.

(21) Appl. No.: 18/014,231

(22) PCT Filed: Jun. 30, 2021

(86) PCT No.: PCT/US2021/039859
§ 371 (c)(1),
(2) Date: Jan. 3, 2023

(87) PCT Pub. No.: WO2022/006252
PCT Pub. Date: Jan. 6, 2022

(65) Prior Publication Data
US 2023/0256803 A1    Aug. 17, 2023

Related U.S. Application Data

(60) Provisional application No. 63/047,971, filed on Jul. 3, 2020.

(51) Int. Cl.
*B60K 1/04* (2019.01)
*H01M 50/204* (2021.01)
(Continued)

(52) U.S. Cl.
CPC ............. *B60K 1/04* (2013.01); *H01M 50/204* (2021.01); *H01M 50/244* (2021.01);
(Continued)

(58) Field of Classification Search
CPC ......................... B60K 1/04; B60K 2001/0438
See application file for complete search history.

(56) References Cited

U.S. PATENT DOCUMENTS 6,040,080 A      3/2000  Minami et al.
11,370,287 B2 *  6/2022  Tsuyuzaki ............ B62D 21/157
(Continued)

FOREIGN PATENT DOCUMENTS

DE   102011005403 A1   6/2012
JP       H10162797 A    6/1998
(Continued)

OTHER PUBLICATIONS

Supplementary European Search Report issued in corresponding European Appln. No. 21831536, dated Jul. 10, 2024.
(Continued)

*Primary Examiner* — Brian L Swenson
(74) *Attorney, Agent, or Firm* — MaxGoLaw PLLC

(57) ABSTRACT

A battery tray for mounting a battery for driving a vehicle includes a bottom; a peripheral wall erected on an outer circumference of the bottom; a flange connected to a top of the peripheral wall and extending outwards of the peripheral wall; a first inner wall connected to the bottom, a bending angle between the first inner wall and the bottom being between 90 degrees and 135 degrees; a second inner wall connected to the bottom, a bending angle between the second inner wall and the bottom being between 90 degrees and 135 degrees; and a stud bolt pedestal connected to both the first inner wall and the second inner wall and provided above the bottom. The bottom, the peripheral wall, the
(Continued)

flange, the first inner wall, the second inner wall, and the stud bolt pedestal being integrally molded from fiber reinforced plastics containing discontinuous fibers.

11 Claims, 7 Drawing Sheets

(51) Int. Cl.
*H01M 50/244* (2021.01)
*H01M 50/249* (2021.01)
*H01M 50/264* (2021.01)

(52) U.S. Cl.
CPC ....... *H01M 50/249* (2021.01); *H01M 50/264* (2021.01); *B60K 2001/0438* (2013.01); *H01M 2220/20* (2013.01)

(56) References Cited

U.S. PATENT DOCUMENTS

| | | |
|---|---|---|
| 2009/0145676 A1 | 6/2009 | Takasaki et al. |
| 2012/0103714 A1 | 5/2012 | Choi et al. |
| 2014/0352886 A1 | 12/2014 | Choi et al. |
| 2015/0251642 A1* | 9/2015 | Tanigaki ................. B60T 7/045 188/2 D |
| 2019/0036092 A1 | 1/2019 | Gunther et al. |
| 2020/0227706 A1* | 7/2020 | Kuno ....................... B60K 1/04 |
| 2023/0137848 A1* | 5/2023 | Naruke ............... H01M 50/264 180/68.5 |

FOREIGN PATENT DOCUMENTS

| | | |
|---|---|---|
| JP | 2012094476 A | 5/2012 |
| JP | 2012126058 A | 7/2012 |
| JP | 2012169171 A | 9/2012 |
| KR | 1020140044710 A | 4/2014 |
| KR | 101425569 B1 | 8/2014 |
| KR | 1020170102741 A | 9/2017 |

OTHER PUBLICATIONS

Int'l Search Report for PCT/US2021/039859, Oct. 28, 2021.
Office Action issued in corresponding Japanese Appln. No. 2022-574557, dated Dec. 21, 2023.
First office action issued in corresponding Korean Patent Appln. No. 202180056899.7, dated May 15, 2025.

* cited by examiner

BATTERY TRAY MADE OF INTEGRALLY MOLDED FIBER REINFORCED PLASTICS

CROSS REFERENCE TO RELATED APPLICATIONS

This application claims priority benefit of U.S. Provisional Application Ser. No. 63/047,791 filed 3 Jul. 2020, the contents of which are hereby incorporated by reference.

TECHNICAL FIELD

The present disclosure relates to a battery tray made of integrally molded fiber reinforced plastics.

BACKGROUND ART

Since an on-vehicle battery occupies considerable weight and mounting space in an electric automobile, various studies have been performed on the structure thereof.

For example, JP-UM-B-7-43950 discloses a battery tray made of fiber reinforced plastics which includes a locking mechanism for a clamp bolt for mounting a battery.

In JP-A-2013-201112, a case for accommodating a battery is made of fiber reinforced plastics so as to reduce the weight of a battery tray.

JP-A-2018-156825 discloses a battery pack in which a plurality of batteries are accommodated and the batteries are coupled together and fixed to a battery tray.

JP-A-2011-124101 disclose a battery case which enhances the strength and rigidity of a battery tray with a frame-shaped frame made of metal.

Technical Problems

However, according to the battery tray disclosed in JP-UM-B-7-43950, when a battery is large, or when a plurality of batteries are mounted, it is difficult to lock the battery or batteries only by the locking mechanism provided around the battery tray.

Since the battery tray disclosed in JP-A-2013-201112 requires large battery brackets provided on both sides of the battery tray, the size of the battery tray increases. If such large battery brackets are provided, in order to mount the same amount and number of batteries, it is necessary to increase the width of a vehicle itself (and therefore, the degree of freedom in design of a vehicle is deteriorated).

In case of the battery tray disclosed in JP-A-2018-156825, cross members which are reinforcing members are provided between batteries and the batteries are fixed thereto. Although the batteries do not move relative to the battery tray, it is necessary to provide cross members separately, and the weight of the battery tray increases. Moreover, it requires a process of mounting the cross members which are separate components, and therefore the manufacturing process becomes complicated.

In case of the battery tray disclosed in JP-A-2011-124101, since it is not reinforced by fibers, it is necessary to reinforce the battery tray with the frame-shaped frame made of metal, and thus the weight of the battery box cannot be reduced.

Accordingly, in view of the problems in the related art, the present disclosure provides a battery tray made of integrally molded fiber reinforced plastics which does not require separate cross members or the like for fixing a battery and is capable of easily fixing the battery.

SUMMARY OF INVENTION

A battery tray is provided for mounting a battery for driving a vehicle. The battery tray includes a bottom; a peripheral wall erected on an outer circumference of the bottom; a flange connected to a top of the peripheral wall and extending outwards of the peripheral wall; a first inner wall connected to the bottom, with a bending angle between the first inner wall and the bottom being 90 degrees or more and 135 degrees or less. The battery tray has a second inner wall connected to the bottom, with a bending angle between the second inner wall and the bottom being 90 degrees or more and 135 degrees or less. A stud bolt pedestal is connected to both the first inner wall and the second inner wall and provided above the bottom. The bottom, the peripheral wall, the flange, the first inner wall, the second inner wall, and the stud bolt pedestal are integrally molded from fiber reinforced plastics containing discontinuous fibers.

BRIEF DESCRIPTION OF DRAWINGS

The present invention is further detailed with respect to the following drawings that are intended to show certain aspects of the present invention but should not be construed as a limit on the practice of the present invention.

DESCRIPTION OF EMBODIMENTS

The present invention has utility as a battery tray for mounting a battery for providing energy to a vehicle. The battery tray includes a bottom; a peripheral wall erected on an outer circumference of the bottom; a flange connected to a top of the peripheral wall and extending outwards of the peripheral wall; a first inner wall connected to the bottom, with a bending angle between the first inner wall and the bottom being 90 degrees or more and 135 degrees or less. The battery tray has a second inner wall connected to the bottom, with a bending angle between the second inner wall and the bottom being 90 degrees or more and 135 degrees or less. A stud bolt pedestal is connected to both the first inner wall and the second inner wall and provided above the bottom. The bottom, the peripheral wall, the flange, the first inner wall, the second inner wall, and the stud bolt pedestal are integrally molded from fiber reinforced plastics containing discontinuous fibers.

Among the advantages of the present invention, since the battery tray utilizes integrally formed fiber reinforced plastic, the stud bolt for fixing a battery is already provided at the time of completion of the molding of the fiber reinforced plastics. Accordingly, when fixing a plurality of batteries, there is no need to separately provide a stud bolt pedestal and a partition.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Embodiments of the present disclosure will be described below. However, the present disclosure is not limited thereto.

Battery Tray

Figure 1:
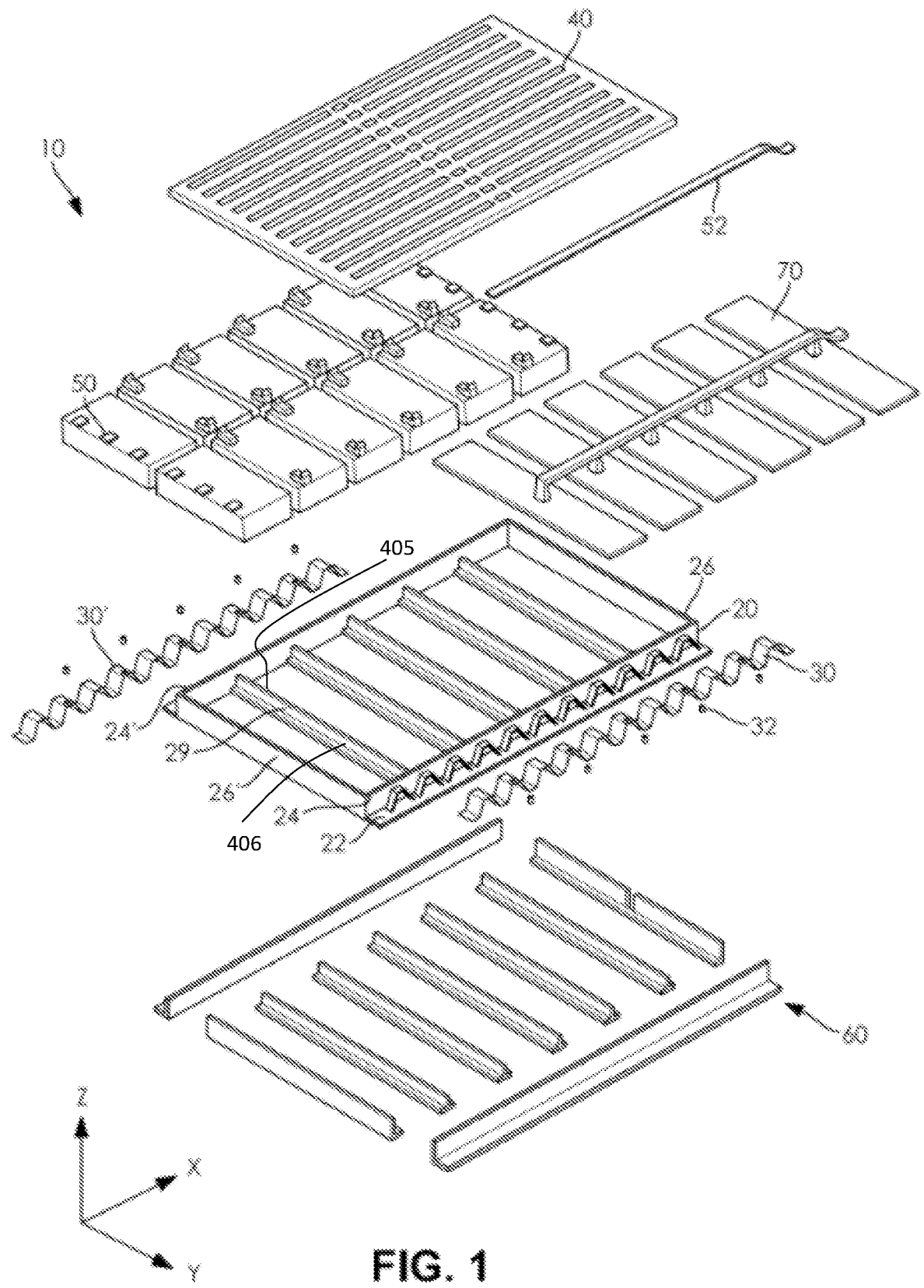
FIG. 1 is an exploded perspective view of a battery box using a battery tray according to an embodiment of the present disclosure.

As shown in FIG. 1, a battery box includes a battery tray 20 and a battery cover 40. The battery box accommodates batteries 50 for providing power to and driving a vehicle. In the present disclosure, the battery tray 20 is made of fiber reinforced plastics containing reinforcing fibers and a resin.

Figure 4:
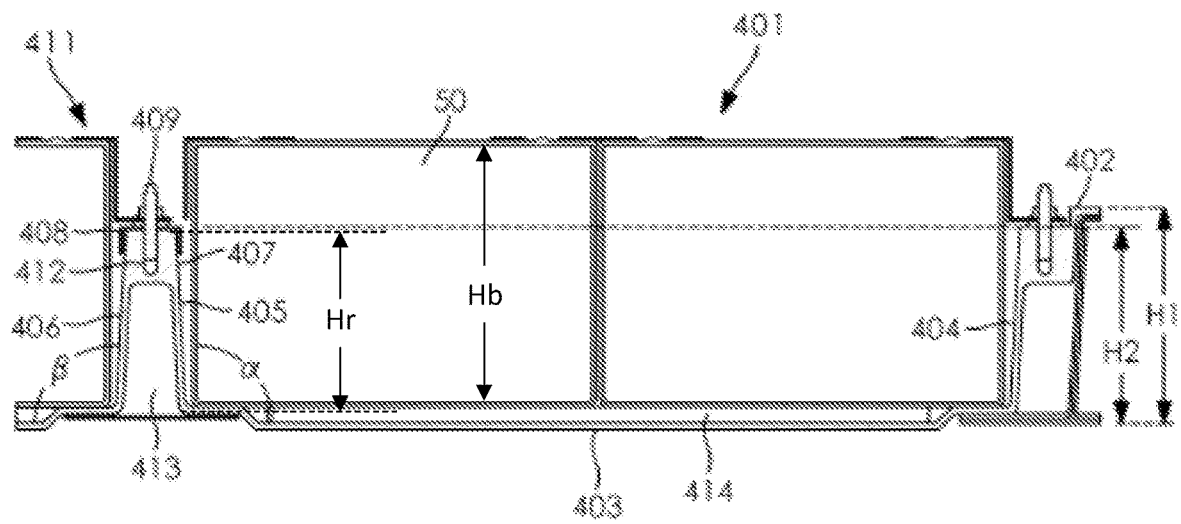
FIG. 4 is a cross-sectional view of the battery tray according to the embodiment of the present disclosure (a cross section taken along line IV-IV in FIG. 3 where a stud bolt pedestal is present)

As shown in FIG. 4, the battery tray 401 according to the present disclosure includes a flange 402, a bottom 403, a peripheral wall 404 erected on an outer circumference of the bottom 403, a first inner wall 405 connected to the bottom 403, a second inner wall 406 connected to the bottom 403, and a stud bolt pedestal 407 connected to both the first inner wall 405 and the second inner wall 406. The stud bolt pedestal 407 is raised from the bottom 403.

Bottom

As shown in FIG. 4, the bottom 403 has a lower surface which is the lowermost surface of the battery tray 401. Batteries 50 may be placed on an upper surface of the bottom 403. The batteries 50 may be spaced from the bottom 403 to provide a cooling mechanism (reference sign 70 in FIG. 1 and reference sign 414 in FIG. 4) between the batteries 50 and the bottom 403. The bottom 403 is not required to be a complete flat plate, and may have a corrugated shape or a curved shape.

Peripheral Wall

Figure 3:
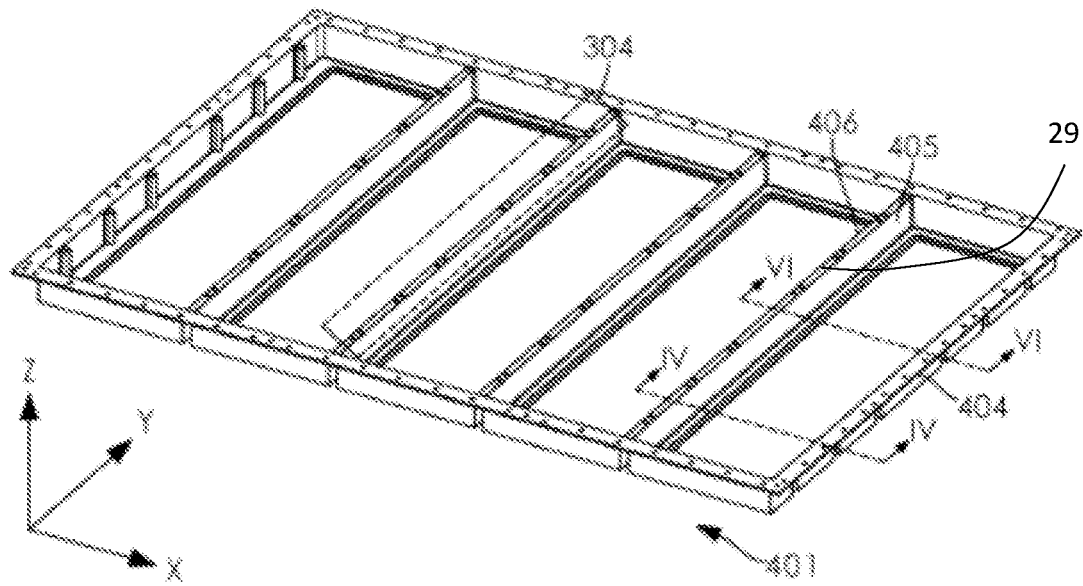
FIG. 3 is a perspective view of the battery tray according to an embodiment of the present disclosure.

As shown in FIGS. 3 and 4, the peripheral wall 404 is erected on the outer circumference of the bottom 403. It is preferable that the peripheral wall 404 be formed continuously with the bottom 403.

Flange

As shown in FIG. 4, the flange 402 is connected to a top of the peripheral wall 404 and extends outwards of the peripheral wall 404. The flange 402 of the battery tray 401 is used when the battery tray 401 is fastened to the battery cover 40 using a bolt or an adhesive.

First Inner Wall and Second Inner Wall

The first inner wall 405 shown in FIG. 4 is connected to the bottom 403. The bottom 403 and the first inner wall 405 are formed integrally and seamlessly. An inner surface of the bottom 403 is continuously connected to a surface of the first inner wall 405. The battery tray 401 bends at a connection between the bottom 403 and the first inner wall 405.

Similarly, the second inner wall 406 shown in FIG. 4 is connected to the bottom 403. The bottom 403 and the second inner wall 405 are formed integrally and seamlessly. An inner surface of the bottom 403 is continuously connected to a surface of the second inner wall 406. The battery tray 401 bends at a connection between the bottom 403 and the second inner wall 406.

It is preferable that the first inner wall 405 be connected to the bottom 403 in a state of intersecting with the bottom 403. Similarly, it is preferable that the second inner wall 406 be connected to the bottom 403 in a state of intersecting with the bottom 403. Here, "intersecting" means a state where a two-dimensional cross-section of the battery tray 401 shows the bottom 403 crossing the first inner wall 405 and the second inner wall 406.

Internal Division Wall

As shown in FIG. 1, the first inner wall 405 and the second inner wall 406 form an internal division wall 29 that divides an inside of the battery tray 401. There may be two or more internal division walls 29. In FIG. 3, four internal division walls extend in the Y-axis direction. It is preferable that the X-axis direction in FIG. 3 be an axle direction (vehicle traveling direction) and the Y-axis direction be a vehicle width direction.

Stud Bolt Pedestal

The stud bolt pedestal 407 shown in FIG. 4 is connected to both the first inner wall 405 and the second inner wall 406, and the bottom of the stud bolt pedestal 407 is provided above the bottom 403. That is, the first inner wall 405 and the second inner wall 406 are connected to each other via the stud bolt pedestal 407.

Integral Molding

The flange 402, the bottom 403, the peripheral wall 404, the first inner wall 405, the second inner wall 406, and the stud bolt pedestal 407 are integrally molded from fiber reinforced plastics. Here, integral molding refers to a continuous and seamless molding of these members. An integrally molded fiber plastic is not formed by joining separate members to each other. Such integral molding can fabricate an integrated fiber reinforced plastic by one-time molding and can be preferably realized by press molding. The integrated fiber reinforced plastic may be fabricated by integral molding using a sheet molding compound (also referred to as SMC).

With such fabrication by integral molding, separate components can be worked as a single component, and thus the component unit price can be reduced. Further, the number of assembling processes is reduced, and the cost relating to inventory can be reduced due to a decrease in the number of components. In particular, in the present disclosure, a stud bolt pedestal 407 for fixing batteries 50 can be integrally molded.

Angle

An angle formed between the bottom 403 and the first inner wall 405 is exemplified by reference sign a in FIG. 4. An angle formed between the bottom 403 and the second inner wall 406 is exemplified by β in FIG. 4.

The angle α formed between the bottom 403 and the first inner wall 405, and the angle β formed between the bottom 403 and the second inner wall 406 are 90 degrees or more and 135 degrees or less, respectively. If these angles α and β are less than 90 degrees, it is difficult to take a molded battery tray 401 out from a mold after molding. On the contrary, if these angles α and β are more than 135 degrees, it becomes difficult for the first inner wall 405 and the second inner wall 406 to match the shape of the battery 410 which may have a rectangular parallelepiped shape or a cube shape, for example. In other words, within the range of the angle described above, it is possible to increase the size of the battery 50 per unit area of the battery tray 401.

The angle α formed between the bottom 403 and the first inner wall 405, and the angle β formed between the bottom 403 and the second inner wall 406 are preferably 90 degrees or more and 120 degrees or less, and more preferably 90 degrees or more and 100 degrees or less, respectively.

In order to measure the angle α formed between the bottom 403 and the first inner wall 405, and the angle β formed between the bottom 403 and the second inner wall 406, the cross section of the battery tray 401 may be observed. It is preferable that a direction of such cross-sectional observation be a direction perpendicular to the bottom 403 and the first inner wall 405, or perpendicular to the bottom 403 and the second inner wall 406. The cross-section to be observed may be FIG. 4, for example.

If the bottom 403, the first inner wall 405, or the second inner wall 406 has a curved shape in the cross-section, angles are measured by drawing tangential lines to the curve, and the largest angle and the smallest angle in the measured angles are averaged to calculate the angle α or the angle β.

Stud Bolt and Stud Bolt Pedestal

As shown in FIG. 4, it is preferable that the battery tray 401 according to present disclosure be provided with a stud bolt 409 for mounting a battery bracket 411 on the stud bolt pedestal 407. Further, the stud bolt pedestal 407 may include a non-through insertion hole 412, and the stud bolt 409 may be inserted into the insertion hole 412.

The stud bolt 409 is a bolt having threaded portions on both ends thereof, and one end of the stud bolt 409 is screwed into the insertion hole 412 of the stud bolt pedestal 407. A battery bracket 411 for fixing a battery is fastened to the other end of the stud bolt.

The shape of the stud bolt 409 is not particularly limited.

Through Hole for Fixing Battery Bracket

In case of a conventional battery tray, in order to fasten a battery to the battery tray, it was necessary to provide a through hole for fixing a battery bracket in the battery tray.

In the present disclosure, since the flange 402, the bottom 403, the peripheral wall 404, the first inner wall 405, the second inner wall 406, and the stud bolt pedestal 407 are integrally molded from fiber reinforced plastics, the through hole for fixing the battery bracket can be omitted from the first inner wall 405, the second inner wall 406, the bottom 403, and the stud bolt pedestal 407. Since such a through hole is not provided, the sealing property of the battery box 20 is improved, the humidity in the battery box 10 is stabilized, and the battery lives are prolonged.

It is also preferable that the peripheral wall 404 does not include a through hole for fixing the battery bracket.

Height of Stud Bolt Pedestal

It is preferable that a height H1 from the bottom 403 to the flange 402 and a height H2 from the bottom 403 to an upper surface of the stud bolt pedestal 407 satisfy the relation of $H1*0.3<H2<H1*2.0$.

Since the bottom 403 has a certain thickness, the height H1 is measured on the basis of the center of the bottom 403 in a vertical direction. If the bottom has a corrugated shape or a curved shape, the largest height is measured as the heights H1 and H2.

The heights H1 and H2 are exemplified in FIG. 4.

If the relation of $H1*0.3<H2$ is satisfied, since the position of the stud bolt pedestal 407 is high enough from the bottom 403, the position of the stud bolt 409 can be set high enough to mount a battery bracket 411 on the stud bolt pedestal 407. Accordingly, the fixing position of the battery bracket 411 for fixing a battery is set higher, and the height of the battery bracket 411 can be made low. Since the battery bracket 411 is generally made of metal such as aluminum, such a lower height can contribute to reduction in weight.

The lower limit of the height H2 is preferably more than $H1*0.5$, more preferably more than $H1*0.6$, and still more preferably more than $H1*0.7$. That is, the heights H1 and H2 preferably satisfy the relation of $H1*0.5<H2$, more preferably satisfy the relation of $H1*0.6<H2$, and still more preferably satisfy the relation of $H1*0.7<H2$.

The upper limit value of the height H2 is preferably less than $H1*1.8$, more preferably less than $H1*1.5$, still more preferably less than $H1*1.2$, and most preferably less than $H1*1.0$. That is, the heights H1 and H2 preferably satisfy the relation of $H2<H1*1.8$, more preferably satisfy the relation of $H2<H1*1.5$, still more preferably satisfy the relation of $H2<H1*1.2$, and most preferably satisfy the relation of $H2<H1*1.0$.

If the relation of $H1*0.3<H2<H1*2.0$ is satisfied, as shown in FIG. 4, the spatial region 413 surrounded by the first inner wall 405, the second inner wall 406 and the stud bolt pedestal 407 becomes large.

Another Aspect of Present Disclosure

According to another aspect of the present disclosure, a battery tray 401 according to the following aspect from which the configuration of the angles α and β being 90 degrees or more and 135 degrees or less as described above is omitted may be adopted.

That is, another aspect of the present disclosure provides a battery tray for mounting a battery for driving a vehicle, including:

a bottom;

a peripheral wall erected on an outer circumference of the bottom;

a flange connected to a top of the peripheral wall and extending outwards of the peripheral wall;

a first inner wall connected to the bottom, a connection between the first inner wall and the bottom being bent;

a second inner wall connected to the bottom, a connection between the second inner wall and the bottom being bent; and a stud bolt pedestal connected to both the first inner wall and the second inner wall and provided above the bottom, the bottom, the peripheral wall, the flange, the first inner wall, the second inner wall, and the stud bolt pedestal being integrally molded from fiber reinforced plastics containing discontinuous fibers, a height H1 from the bottom to the flange and a height H2 from the bottom to an upper surface of the stud bolt pedestal satisfying the relation of $H1*0.3<H2<H1*2.0$.

Rib and Boss for Fixing Batteries

It is preferable that a rib or a boss for fixing batteries be provided on an upper surface of the bottom 403 of the battery tray 401. The upper surface of the bottom 403 is a surface for placing batteries on the battery tray 401. A lower surface is a surface opposite to the upper surface. It is preferable that the rib or the boss fix not only the batteries 50 but also wirings and the cooling mechanism 414.

Here, "fix" means suppression of the movement of the batteries, and does not mean complete anchoring.

A height Hr of the rib or the boss and a height Hb of the battery preferably satisfy a relation of $Hb*0.3<Hr$, and more preferably satisfy a relation of $Hb*0.5<Hr$. More specifically, the height Hr is preferably 20 mm to 70 mm, more preferably 30 mm to 60 mm, and still more preferably 40 mm to 50 mm. If the height Hr is within the range described above, the rib or the boss would also contribute to the improvement of the rigidity of the battery tray 401.

It is preferable that the rib or the boss for fixing a battery be integrally molded from fiber reinforced plastics. The rib or the boss integrally formed from fiber reinforced plastics can easily and firmly fix the batteries 50 on the battery tray 401.

Shapes of First Inner Wall and Second Inner Wall

1. Fitting Shape of Battery

It is preferable that at least one of the first inner wall 405 or the second inner wall 406 have a shape fitting the shape of the battery 50. It is more preferable that both of the first inner wall 405 and the second inner wall 406 have a shape fitting the shape of the battery 50.

The "shape fitting the shape of the battery" is designed to the shape in which the first inner wall 405 or the second inner wall 406 fits on the shape of the battery 50, and for example, if the shape of the battery is a cube or a rectangular parallelepiped, the first inner wall or the second inner wall has a flat wall.

2. Mounting of Battery Tray on Lower Part of Vehicle Body

It is preferable that the battery tray 401 according to the present disclosure be mounted on a lower part of a vehicle body of an electric automobile, and that the first inner wall 405 and the second inner wall 406 of the battery tray 401 be provided along at least one of a lateral direction or a longitudinal direction of the vehicle body.

Here, the lateral direction of the vehicle body is, for example, a Y-axis direction in FIG. 1 and is a vehicle width direction. For example, in FIG. 1, the battery tray 20 includes internal division wall 29 formed by the first inner wall 405 and the second inner wall 406 extending in the lateral direction of the vehicle body.

Fiber Reinforced Plastics

1. Reinforcing Fibers

Although the reinforcing fibers used in the present disclosure are not particularly limited, it is preferable that the reinforcing fibers are one or more reinforcing fibers selected from the group consisting of carbon fibers, glass fibers, aramid fibers, boron fibers, and basalt fibers. It is more preferable that the reinforcing fibers are glass fibers. In case of using glass fibers as the reinforcing fibers, the average fiber diameter of the glass fibers is preferably 1 μm to 50 μm, and more preferably 5 μm to 20 μm. If the average fiber diameter is large, the impregnating property of the resin to the fiber is improved, and if it is equal to less than the upper limit, it has excellent molding property and workability.

2. Discontinuous Fibers

In the present disclosure, the reinforcing fibers contain discontinuous fibers. If discontinuous fibers are used, the shaping property is improved as compared to fiber reinforced plastics using continuous fibers only, and it becomes easy to fabricate a complicated molding body.

3. Weight-Average Fiber Length of Reinforcing Fibers

It is preferable that the weight-average fiber length of the reinforcing fibers be 1 mm or more and 100 mm or less. The weight-average fiber length of the reinforcing fibers is more preferably 1 mm to 70 mm, and still more preferably 1 mm to 50 mm.

In recent years, the size of an on-vehicle battery has increased, and the longitudinal and lateral dimensions of the battery box is 1 m×1 m, 1.5 m×1.5 m, or the like. If the weight-average fiber length is 1 mm or more, even in case of fabricating such a large battery box, the mechanical property for storing a large battery can be easily secured.

When fiber reinforced plastics are fabricated by means of injection molding, the weight-average fiber length of the reinforcing fibers is typically about 0.1 mm to 0.3 mm. When the fiber reinforced plastics are fabricated by means of press molding, the weight-average fiber length of the reinforcing fibers is not limited within the range of 0.1 mm to 0.3 mm. Accordingly, it is preferable that the fiber reinforced plastics be fabricated by means of press molding when the weight-average fiber length of the reinforcing fibers is within a range of 1 mm or more and 100 mm or less.

It is preferable that the weight-average fiber length of the reinforcing fibers be set to be 100 mm or less because it has excellent flowability. In the present disclosure, discontinuous reinforcing fibers having different fiber lengths may be used together. In other words, the discontinuous fibers used in the present disclosure may have a single peak or a plurality of peaks in the weight-average fiber length distribution.

4. Fiber Volume Fraction

Although a fiber volume fraction Vf of the reinforcing fibers is not particularly limited, it is preferably 20% to 70%, more preferably 25% to 60%, and still more preferably 30% to 55%.

The fiber volume fraction (Vf, unit: % by volume) refers to a ratio of a volume of the reinforcing fibers with respect to the total volume including not only the reinforcing fibers and a matrix resin but also other additives.

5. Resin

In the present disclosure, the type of resin is not particularly limited, and a thermosetting resin or a thermoplastic resin is used. In case of using a thermosetting resin, it is preferably an unsaturated polyester resin, a vinylester resin, an epoxy resin, or a phenolic resin.

A single type of resin may be used alone, or two or more types of resins may be used in combination.

6. Other Agents

The fiber reinforced plastics used in the present disclosure may include additives such as various fibrous filler made of organic fibers or inorganic fibers or non-fibrous filler such as an inorganic filler, a flame retardant, an anti-ultraviolet agent, a stabilizer, a release agent, a pigment, a softener, a plasticizer, or a surfactant as long as it does not impair the object of the present disclosure.

Further, in case of using a thermosetting resin, a thickener, a hardener, a polymerization initiator or a polymerization inhibitor may be contained.

One kind of additive may be used alone, and two or more kinds of additives may be used in combination.

7. Sheet Molding Compound

It is preferable that the fiber reinforced plastics be fabricated with a sheet molding compound (also referred to as SMC) using discontinuous reinforcing fibers. The weight can be reduced when the battery box 10 is made of the fiber reinforced plastics made of the SMC as compared to a battery box made of metal.

Due to high moldability of the sheet molding compound, complicated shapes like a battery tray or a battery cover can be easily molded from the SMC.

That is, it is possible to manufacture fiber reinforced plastics by molding a sheet molding compound to manufacture the components of the battery box having a concave portion and a convex portion. Since the sheet molding compound is excellent in flowability and shaping property as compared to the fiber reinforced plastics containing continuous fibers, ribs and bosses can be fabricated easily.

As the fiber reinforced plastics using a sheet molding compound (SMC), a sheet molding compound manufactured by Continental Structural Plastics (also abbreviated as CSP) can be used.

Comparison with JP-A-2011-124101

The battery tray made of a thin-walled resin disclosed in JP-A-2011-124101 is fabricated by injection molding, and the partition wall is a rib protruding from the bottom of the battery tray. If the resin of JP-A-2011-124101 contains fibers, it is difficult to inject reinforcing fibers having a weight-average fiber length of 1 mm or more and 100 mm or less into the tip end of the rib. Even in case of press molding, not injection molding, since the partition wall containing fibers protrudes from the bottom, the tip end of the rib contains more resin than the bottom end of the rib and the physical property thereof is deteriorated if the rib of the partition wall is designed to be high.

Dispersion of Discontinuous Fibers in Boundary Regions

In the present disclosure, it is preferable that the discontinuous fibers be continuously dispersed in a boundary region between the bottom and the first inner wall, a boundary region between the bottom and the second inner wall, and a boundary region between the bottom and the peripheral wall.

Since the bottom, the peripheral wall, the first inner wall, and the second inner wall are integrally molded fiber reinforced plastics, the discontinuous fibers can be easily and continuously dispersed in the boundary regions.

Here, the term "continuously dispersed" refer to a state in which discontinuous fibers are continuously entangled with each other. In order for the reinforcing fibers to be continuously dispersed in the boundary regions, it is sufficient that the reinforcing fibers are continuously entangled with each other at least in part of the boundary regions, and the reinforcing fibers are not required to be continuously entangled with each other over the entire boundary regions. If the reinforcing fibers are continuously dispersed in an in-plane direction in the boundary regions, the mechanical property of the boundary regions is improved as compared to the related art.

In the related art, when the first inner wall and the second inner wall (for forming the internal division wall, a so-called partition) are mounted as separate components, the fastening to the bottom is required. However, when the internal division wall is mounted as a separate component, the fastening force between the internal division wall and the bottom is inevitably lowered, and the fastening force becomes unstable.

Deck

The first inner wall 405 and the second inner wall 406 in FIG. 3 form internal division walls 29. In the battery tray 401 according to the present disclosure, the first inner wall 405 and the second inner wall 406 are connected to each other via the stud bolt pedestal 407 in FIG. 4. In other words, the stud bolt pedestal 407 is provided at the top of the internal division wall 29.

Figure 6:
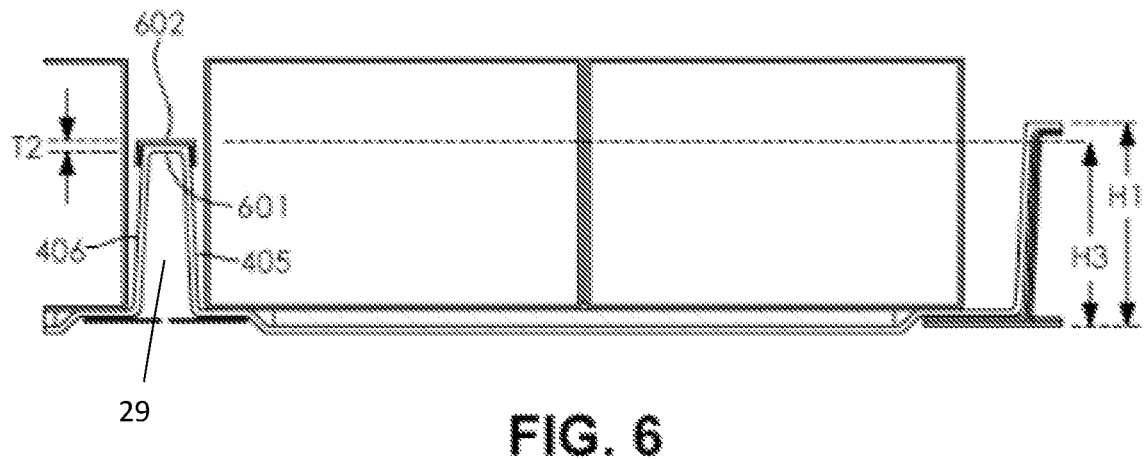
FIG. 6 is a cross-sectional view of the battery tray according to the embodiment of the present disclosure (a cross section taken along line VI-VI in FIG. 3 where a stud bolt pedestal is not present)
Figure 7A:
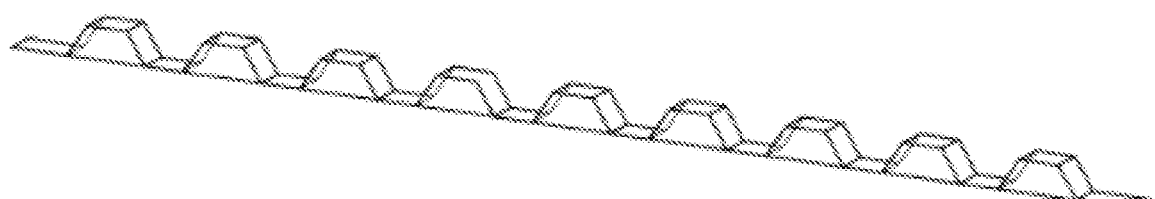
FIG. 7A is a perspective view of an energy absorbing member provided in the battery tray according to an embodiment of the present disclosure.
Figure 7B:
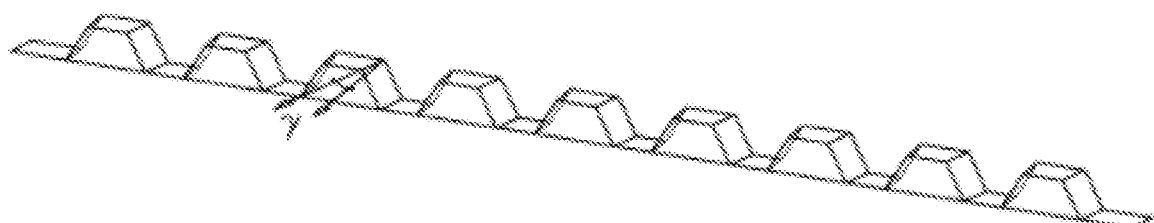
FIG. 7B is a perspective view of an energy absorbing member provided in the battery tray according to an embodiment of the present disclosure.
Figure 7C:
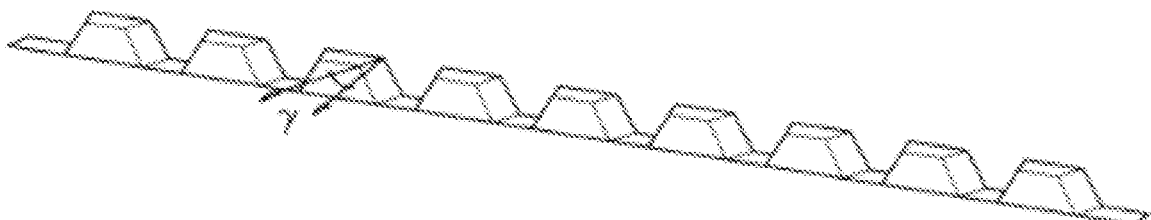
FIG. 7C is a perspective view of an energy absorbing member provided in the battery tray according to an embodiment of the present disclosure.
Figure 8A:
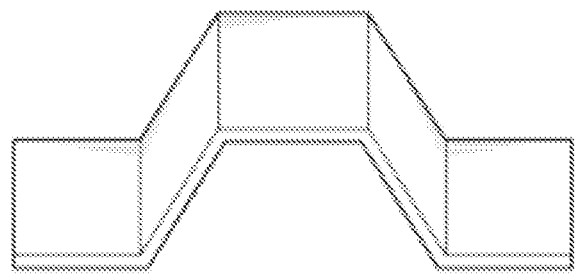
FIG. 8A is a schematic view of a hat-shaped energy absorbing member provided in the battery tray (an example of reference sign 202 in FIG. 2) seen from above in a vehicle width direction.
Figure 8B:
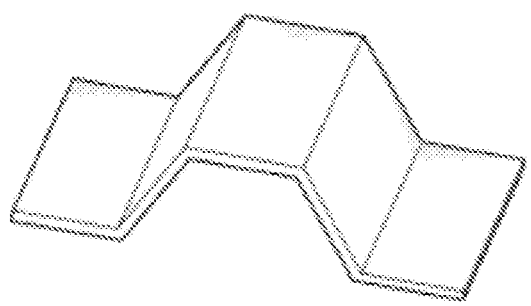
FIG. 8B is a perspective view of the hat-shaped energy absorbing member of FIG. 8A seen from obliquely above in the vehicle width direction.
Figure 8C:
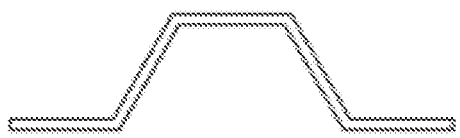
FIG. 8C is a front view of the hat-shaped energy absorbing member of FIG. 8A seen in the vehicle width direction.
Figure 8D:
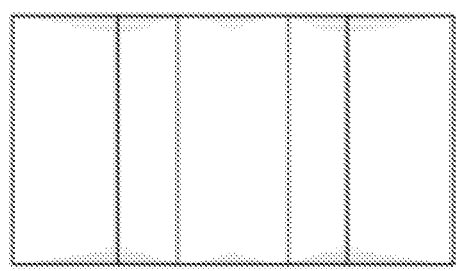
FIG. 8D is a plan view of the hat-shaped energy absorbing member of FIG. 8A seen from above.
Figure 9A:
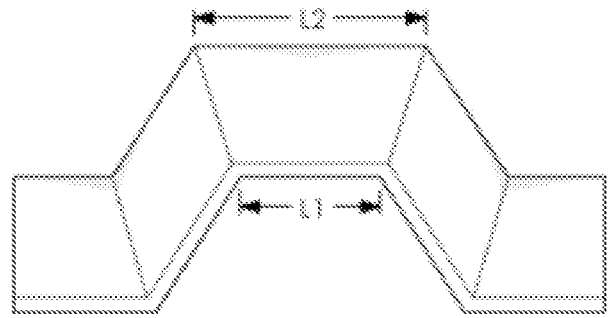
FIG. 9A is a schematic view of a hat-shaped energy absorbing member seen from above in a vehicle width direction.
Figure 9B:
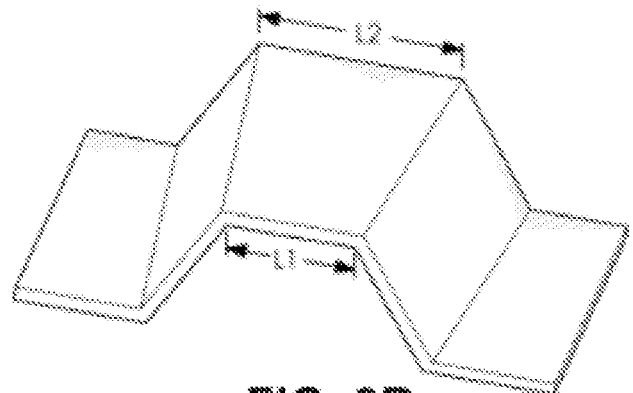
FIG. 9B is a perspective view of the hat-shaped energy absorbing member of FIG. 9A seen from obliquely above in the vehicle width direction.
Figure 9C:
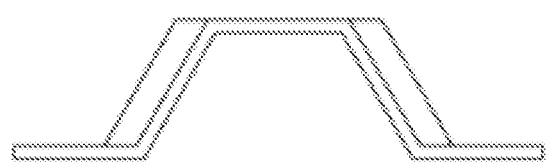
FIG. 9C is a front view of the hat-shaped energy absorbing member of FIG. 9A seen in the vehicle width direction.
Figure 9D:
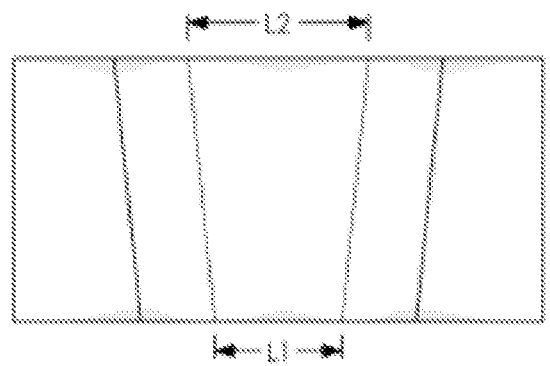
FIG. 9D is a plan view of the hat-shaped energy absorbing member of FIG. 9A seen from above.
Figure 10:
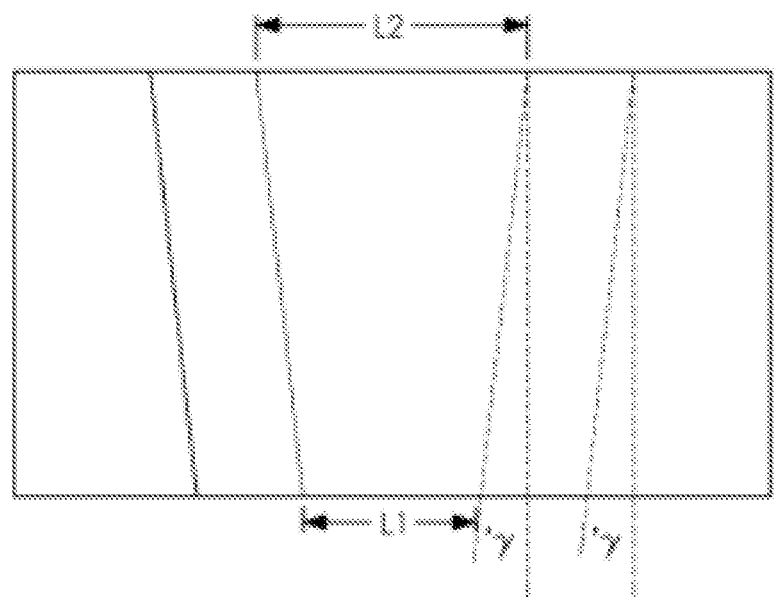
FIG. 10 is a plan view of the hat-shaped energy absorbing member shown in FIGS. 9A-9D seen from above.

If the internal division wall 29 does not have to be provided with an insertion hole 412 in FIG. 4 for a stud bolt 409, the internal division wall 29 may have a deck 601 as shown in FIG. 6 in place of the stud bolt pedestal 407. In other words, in the battery tray according to the present disclosure, it is preferable that the first inner wall 405 and the second inner wall 406 may be connected to each other via the deck 601 in FIG. 6 and that the deck 601 be raised from the bottom 403 by the first inner wall 405 and the second inner wall 406. FIG. 6 is a cross-sectional view taken along line VI-VI in FIG. 3 where there is no stud bolt pedestal 407 at the top of the internal division wall 29 formed by the first inner wall 405 and the second inner wall 406.

Figure 5:
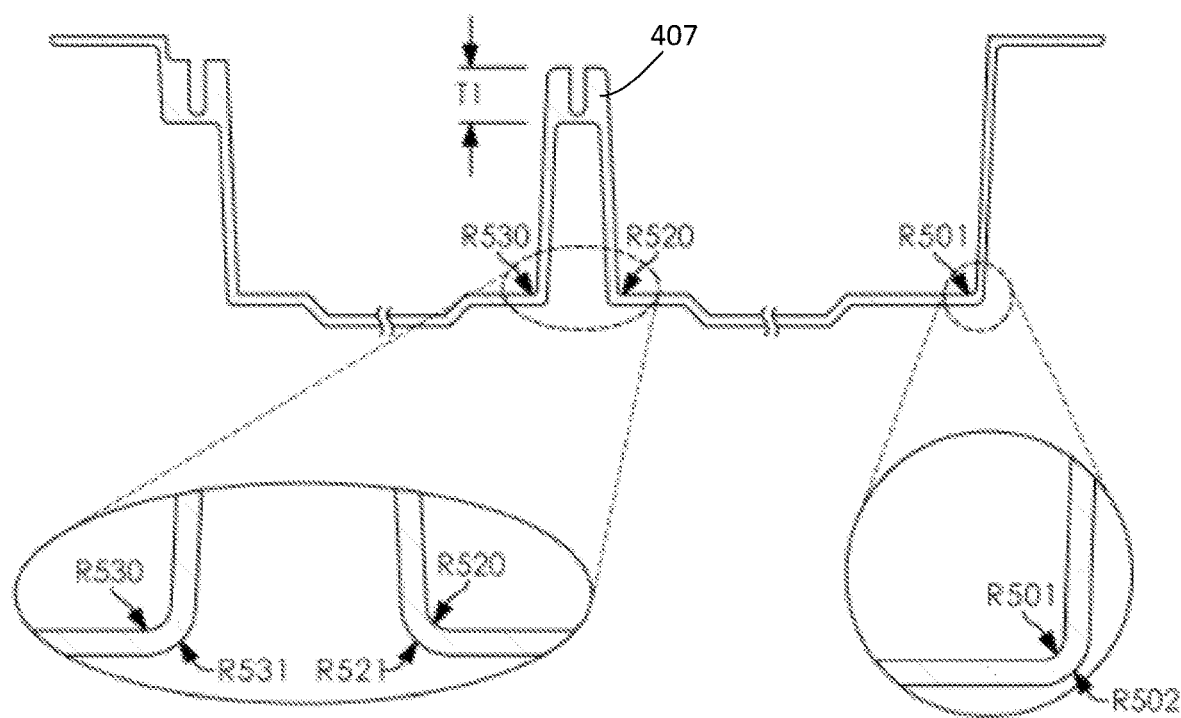
FIG. 5 is a cross-sectional view of the battery tray according to an embodiment of the present disclosure.

Here, it is preferable that a thickness T1 of the stud bolt pedestal 407 shown in FIG. 5 and a thickness T2 of the deck 601 shown in FIG. 6 satisfy the relation of $T2<T1$. In other words, it is preferable that a thickness of the top (reference sign 304 in FIG. 3) of the internal division wall 29 formed by the first inner wall 405 and the second inner wall 406 have uneven thickness toward the Y-axis direction (vehicle width direction) in FIG. 3, for example. It is preferable that the top 304 of the internal division wall 29 has a repetitive structure of the stuck bolt pedestal 407 and the deck 601. By designing the thickness (also referred to as wall thickness) T2 of the deck 601 to be smaller than the thickness T1 of the stud bolt pedestal 407, the weight of the battery tray 401 can be reduced. The thicknesses T1 and T2 preferably satisfy the relation of $T2*0.8<T1$, and more preferably satisfy the relation of $T2*0.5<T1$.

It is preferable that the deck 601 be integrally molded with the flange 402, the bottom 403, the peripheral wall 404, the first inner wall 405, the second inner wall 406 and the stud bolt pedestal 407.

The deck 601 may be covered with a metal cover 602 to improve the rigidity.

Height of Deck

It is preferable that the height H1 of the flange 402 from the bottom 403 and the height H3 of the deck 601 from the bottom 403 satisfy the relation of $H1*0.3<H3<H1*2.0$. The heights H1 and H3 are exemplified in FIG. 6. If the deck 601 is a curved surface or the like, the highest height H3 is measured.

If the relation of $H1*0.3<H3$ is satisfied, the height of the internal division wall 29 increases, and therefore the batteries (50) can be held stably. The lower limit of the height H3 is preferably more than $H1*0.5$, more preferably more than $H1*0.6$, and still more preferably more than $H1*0.7$. That is, the heights H1 and H3 preferably satisfy the relation of $H1*0.5<H3$, more preferably satisfy the relation of $H1*0.6<H3$, and still more preferably satisfy the relation of $H1*0.7<H3$.

The upper limit of the height H3 is preferably less than H1*1.8, more preferably less than H1*1.5, still more preferably less than H1*1.2, and most preferably less than H1*1.0. That is, the heights H1 and H3 preferably satisfy the relation of H3<H1*1.8, more preferably satisfy the relation of H3<H1*1.5, still more preferably satisfy the relation of H3<H1*1.2, and most preferably satisfy the relation of H3<H1*1.0.

The height H2 the upper surface of the stud bolt pedestal 407 from the bottom 403 and the height H3 of the deck 601 from the bottom 403 preferably satisfy the relation of H2*0.8<H3<H1*1.2, more preferably satisfy the relation of H2*0.9<H3<H1*1.1, and still more preferably satisfy the relation of H2=H3.

Average Thickness of Fiber Reinforced Plastics

In the present disclosure, it is preferable that an average thickness Tave of the fiber reinforced plastics be 1.5 mm or more and less than 5 mm. The thickness equal to or less than 5 mm is preferable in terms of reducing the weight of the battery box 10.

The average thickness Tave of the fiber reinforced plastics is preferably 2 to 5 mm and more preferably 3 to 5 mm.

Radius of Curvature of Inner Corner Part

The boundary region between an upper surface of the bottom 403 and an inner surface of the peripheral wall 404 preferably has an inner corner part having the radius of curvature equal to or more than 1 mm and equal to or less than 10 mm. The radius of curvature is more preferably 1 mm or more and 7 mm or less, and still more preferably 2 mm or more and 4 mm or less.

The inner corner part in the boundary region between the upper surface of the bottom 403 and the inner surface of the peripheral wall 404 is exemplified, for example, by reference sign R501 in FIG. 5.

The boundary region between the upper surface of the bottom 403 and an inner surface of the first inner wall 405 preferably has an inner corner part having the radius of curvature equal to or more than 1 mm and equal to or less than 10 mm. The inner corner part in the boundary region between the upper surface of bottom 403 and the inner surface of the first inner wall 405 is exemplified, for example, by reference sign R520 in FIG. 5. The radius of curvature is more preferably 1 mm or more and 7 mm or less, and still more preferably 2 mm or more and 4 mm or less.

The boundary region between the upper surface of the bottom 403 and an inner surface of the second inner wall 406 preferably has an inner corner part having the radius of curvature equal to or more than 1 mm and equal to or less than 10 mm. The inner corner part in the boundary region between the upper surface of the bottom 403 and the inner surface of the second inner wall 406 is exemplified, for example, by reference sign R530 in FIG. 5. The radius of curvature is more preferably 1 mm or more and 7 mm or less, and still more preferably 2 mm or more and 4 mm or less.

Radius of Curvature of Outer Corner Part

The boundary region between a lower surface of the bottom 403 and an outer surface of the peripheral wall 404 preferably has an outer corner part having the radius of curvature equal to or more than 2 mm and equal to or less than 11 mm. The radius of curvature is more preferably 2 mm or more and 8 mm or less, and still more preferably 3 mm or more and 7 mm or less.

The outer corner part in the boundary region between the lower surface of the bottom 403 and the outer surface of the peripheral wall 404 is exemplified, for example, by reference sign R502 in FIG. 5.

The boundary region between the lower surface of the bottom 403 and an outer surface of the first inner wall 405 preferably has an outer corner part having the radius of curvature equal to or more than 2 mm and equal to or less than 11 mm. The outer corner part in the boundary region between the lower surface of the bottom 403 and the outer surface of the first inner wall 405 is exemplified, for example, by reference sign R521 in FIG. 5. The radius of curvature is more preferably 2 mm or more and 8 mm or less, and still more preferably 3 mm or more and 7 mm or less.

The boundary region between the lower surface of the bottom 403 and an outer surface of the second inner wall 406 preferably has an outer corner part having the radius of curvature equal to or more than 12 mm and equal to or less than 22 mm. The outer corner part in the boundary region between the lower surface of the bottom 403 and the outer surface of the second inner wall 406 is exemplified, for example, by reference sign R531 in FIG. 5. The radius of curvature is more preferably 2 mm or more and 8 mm or less, and still more preferably 3 mm or more and 7 mm or less.

The radii of curvatures of the outer corner parts are preferably larger than those of the inner corner parts.

Battery for Driving Vehicle

The battery according to the present disclosure is a battery for providing power to and for driving a vehicle, and is preferably a battery for powering and driving an automobile.

Energy Absorbing Member

Figure 2:
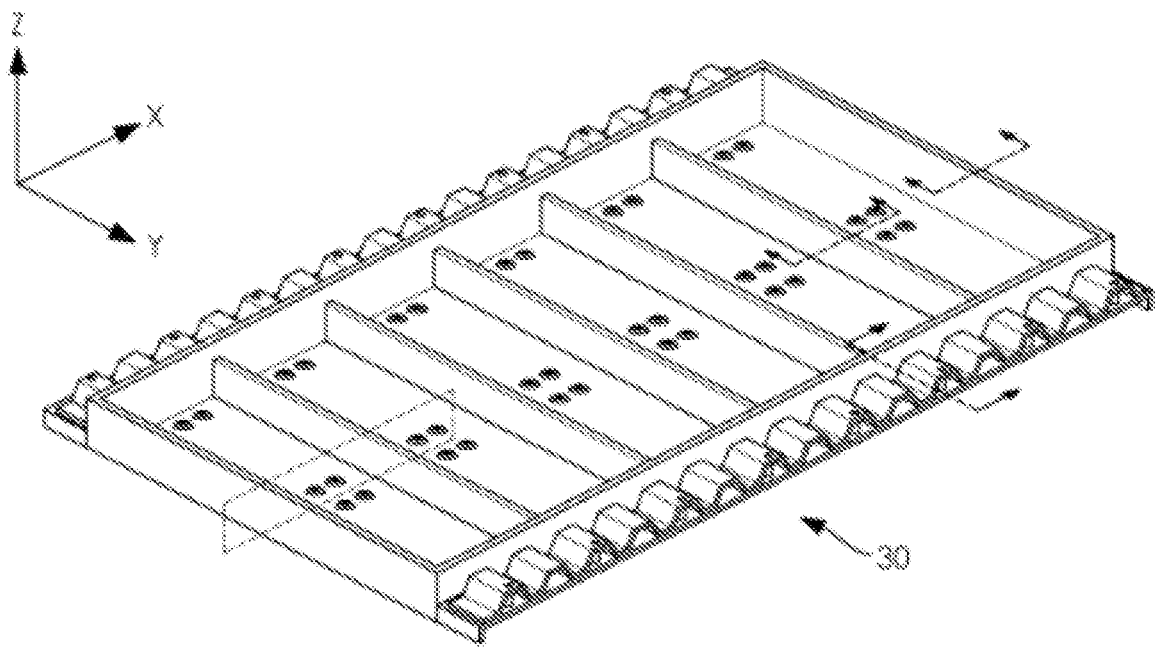
FIG. 2 is a perspective view of the battery tray according to an embodiment of the present disclosure in which an energy absorbing member is provided.

It is preferable that the battery tray 20, 401 according to the present disclosure includes an energy absorbing member (reference sign 30 in FIGS. 1 and 2).

With an increase in mounting amount of batteries for automobiles, the size of the battery case has been increasing year after year. The length of the battery case in the vehicle width direction is 70% or more of the width of the automobile in many cases, and may be 80% or more. Therefore, when a large-sized battery case is mounted on the lower part of the automobile, a larger load than the conventional load is input to the battery case at the time of collision. Accordingly, it is preferable that an energy absorbing structure be provided for absorbing an impact energy of the collision to protect the battery.

It is preferable that the energy absorbing member 30 be provided for absorbing the impact energy from the lateral direction of the vehicle body, and that the energy absorbing member 30 be provided along an outside of the peripheral wall 404 in the longitudinal direction of the vehicle body. The Y-axis direction in FIG. 2 is the vehicle body direction.

It is preferable that the shape of the energy absorbing member 30 be a repetition of a hat shape as shown in FIG. 2. The energy absorbing member 30 having the hat shape can be fabricated by press molding.

In the shape of the energy absorbing member having a repetition of the hat shape, it is preferable that the relation between a length L1 of an end part on the top surface of the hat on an energy absorption start side and a length L2 of an end part on a battery tray side be L2>L1. The lengths L1 and L2 are measured in the axle direction (FIGS. 9A-9D).

In other words, the top surface of the hat-shaped energy absorbing member is narrowed toward the energy absorption start side at an angle γ with respect to the vehicle width direction (Y-axis direction in FIG. 2), and the angle γ is preferably 3 degrees or more, and more preferably 10 degrees or more. The angle γ is exemplified in FIGS. 7A to 7C and 10.

REFERENCE SIGNS LIST 10 battery box
20 battery tray
22 bottom of battery tray
24, 24' side wall of battery tray
26, 26' end wall of battery tray
28 cavity
29 internal division wall formed by first inner wall and second inner wall
30, 30', 201 energy absorbing member
32 fastener (for fastening energy absorbing member and battery tray)
40 battery cover
50 battery
52 voltage line
60 reinforcing frame
70 temperature control system (cooling mechanism)
304 top of internal division wall
401 battery tray
402 flange
403 bottom
404, 301 peripheral wall
405 first inner wall
406 second inner wall
407 stud bolt pedestal
408 upper surface of stud bolt pedestal
409 stud bolt
410 battery
411 battery bracket
412 insertion hole
413 spatial region surrounded by first inner wall, second inner wall and stud bolt pedestal
414 cooling mechanism
α angle formed between bottom and first inner wall
β angle formed between bottom and second inner wall
h1 height from bottom to flange
h2 height from bottom to upper surface of stud bolt pedestal
h3 height h1 from bottom to flange and height from bottom to second bottom
601 second bottom
602 metal cover
R501 inner corner part in boundary region between bottom and peripheral wall
R502 outer corner part in boundary region between bottom and peripheral wall
R520 inner corner part in boundary region between bottom and first inner wall
R521 outer corner part in boundary region between bottom and first inner wall
R530 inner corner part in boundary region between bottom and second inner wall
R531 outer corner part in boundary region between bottom and second inner wall
γ angle by which top surface of hat-shaped energy absorbing member is narrowed toward energy absorption start side
l1 length of end part on energy absorption start side on top surface of hat-shaped energy absorbing member
l2 length of end part on battery tray side on top surface of hat-shaped energy absorbing member Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A battery tray for mounting a battery for driving a vehicle, comprising:
a bottom;
a peripheral wall erected on an outer circumference of the bottom;
a flange connected to a top of the peripheral wall and extending outwards of the peripheral wall;
a first inner wall connected to the bottom, a bending angle between the first inner wall and the bottom being 90 degrees or more and 135 degrees or less;
a second inner wall connected to the bottom, a bending angle between the second inner wall and the bottom being 90 degrees or more and 135 degrees or less; and
a stud bolt pedestal connected to both the first inner wall and the second inner wall and provided above the bottom;
a deck connected to the first inner wall, the second inner wall, and the stud bolt pedestal; and
wherein the deck is higher than the bottom, and a thickness t1 of the stud bolt pedestal and a thickness t2 of the deck satisfy the relation of t2<t1; and
wherein the bottom, the peripheral wall, the flange, the first inner wall, the second inner wall, and the stud bolt pedestal being integrally molded from fiber reinforced plastics containing discontinuous fibers.

2. The battery tray according to claim 1, further comprising a rib or a boss on an upper surface of the bottom for fixing a battery.

3. The battery tray according to claim 1, in which at least one of the first inner wall or the second inner wall has a shape configured to fit a shape of the battery.

4. The battery tray according to claim 1, wherein a boundary region between the bottom and the peripheral wall has an inner corner part having the radius of curvature equal to or more than 1 mm and equal to or less than 10 mm.

5. The battery tray according to claim 1, wherein the discontinuous fibers are continuously dispersed in a boundary region between the bottom and the first inner wall, a boundary region between the bottom and the second inner wall, and a boundary region between the bottom and the peripheral wall.

6. The battery tray according to claim 1, configured to be mounted on a lower part of a vehicle body of an electric automobile; and
wherein the first inner wall and the second inner wall are provided along one of a lateral direction or a longitudinal direction of the vehicle body.

7. The battery tray according to claim 1, wherein a height h1 from the bottom to the flange and a height h2 from the bottom to an upper surface of the stud bolt pedestal satisfy the relation of $h1*0.3<h2<h1*2.0$.

8. The battery tray according to claim 1, wherein the first inner wall and the second inner wall are connected to each other via the stud bolt pedestal or the deck.

9. The battery tray according to claim 1, wherein the stud bolt pedestal is provided with a stud bolt for mounting a battery bracket.

10. The battery tray according to claim 9, wherein the stud bolt pedestal includes a non-through insertion hole and the stud bolt is inserted into the insertion hole.

11. The battery tray according to claim 9, wherein the first inner wall, the peripheral wall, the second inner wall, and the stud bolt pedestal do not include a through-hole for fixing the battery bracket.

* * * * *